Patented Sept. 5, 1933

1,925,093

UNITED STATES PATENT OFFICE 1,925,093

CHEESE PASTEURIZING PROCESS

Felix M. Frederiksen, Milwaukee, Wis., assignor, by mesne assignments, to Premier-Pabst Corporation, a corporation of Delaware No Drawing. Application May 31, 1932
Serial No. 614,642

4 Claims. (Cl. 99—11)

This invention has to do with the pasteurizing of acid cheeses as a final step in the manufacture thereof and consists in a process wherein a substance supplying hydroxyl ions is mixed in proper amount with the finished cheese, the mixture then being raised to, and maintained for a period at, pasteurizing temperature, whereupon a substance supplying hydrogen ions is thoroughly mixed in proper amount with the cheese before permitting it to cool. Sometimes as an additional step following the above and before permitting the cheese to cool, it is subjected to drastic mechanical working.

Soft acid cheese, particularly cheese of the type commonly known as cream cheese when submitted to pasteurization develops certain extremely undesirable characteristics. Pasteurizing treatment involving heating of cheese for a period of time has the effect of volatilizing or driving out of the cheese, certain acid substances of low vapor pressure which contribute in a large measure to the flavor of the cheese. The loss of these volatile acid constituents leaves the cheese with a flat and unattractive flavor which cannot be restored by subsequent treatment, inasmuch as it is impossible to reconstruct these substances which are the natural product of complex and little understood reactions which take place during the formation of cheese.

The pasteurization treatment of soft acid cheese moreover brings about a degeneration in the texture or grain structure of soft acid cheeses, particularly when the cheese has a large casein rather than paracasein content. At the temperatures prevailing during the pasteurizing period there occurs a pronounced growth in the size of casein particles which is extremely detrimental to the texture of the cheese. The cheese becomes under such conditions, what is commonly called grainy, a definitely objectionable condition. A grainy cheese has an unpleasant sandy taste and a somewhat unattractive appearance and in addition is unstable. Grainy cheese drains excessively and it will not remain long in a homogeneous condition. The loss of moisture through drainage makes its marketing difficult and also deprives the cheese of its plasticity. Even in cheeses containing principally homogenized paracasein rather than casein the pasteurizing treatment tends to produce graininess, although to a much lesser degree.

In spite of the objections outlined above, pasteurizing of the finished cheese is at times practiced. The cheese produced in this way, although having fair keeping qualities is objectionably grainy and flat tasting. Pasteurization is also employed at times as an intermediate step in the manufacture of the cheese. As examples of this, are the practices of pasteurizing the raw cream mix before preparing cheese from it and also the practice of pasteurizing the sour mix before drainage. In either of the latter cases, the subsequent steps in the process of making the cheese provide liberal sources of bacterial contamination. The use of pasteurization in this manner does not result in a pasteurized cheese. The finished cheese has very poor keeping qualities as compared with cheese made according to this invention.

There is also a practice of pasteurizing cheese after it has been placed within the final container. Cheese as pasteurized in this manner cannot be fixed against the degenerative influence of heating which is avoided by this invention, except by the addition of certain gums which merely substitute another form of undesirable texture for the one which pasteurization would normally impose.

The process of this invention, on the other hand, makes possible the pasteurization of soft cheeses whose acidities range from about 3 to 5 pH without bringing about the objectionable results noted above. The cheese treated according to this invention has a more full attractive flavor and is free from graininess and the usual tendency to drain.

In the process of this invention, the cheese is prepared for pasteurization by adding to it a substance which will supply hydroxyl ions in amounts sufficient to bring about a pH lying in a range between 5.5 and 6.5. Under this condition of lowered acidity, casein will not longer exist in granular form but becomes dispersed in a colloidal condition in which state the pasteurization treatment no longer brings about a growth in grain size. This new condition of lowered acidity also alters the equilibrium with respect to the volatile flavor forming acid substances and the same become combined with basic ions to form non-volatile salts or compounds.

The cheese in this "fixed" condition is then subjected to pasteurization to bring about a cheese of improved keeping qualities and to arrest the action of any added starter and contaminating ferments. At the conclusion of the pasteurizing period the pasteurized mixture is "released or unfixed" by the addition of a substance supplying hydrogen ion in sufficient amount to return the acidity of the cheese to a pH of about 3 to 5. Upon returning the cheese to this condition of higher acidity, the state of the casein changes back to a very fine granular form, and inasmuch as the cheese is cooled shortly after the restoration of acidity, the casein grains do not have an opportunity to grow beyond the desired degree of fineness. A thoroughly pasteurized cheese having the texture desired is obtained in this manner.

Conversion of casein from granular to colloidal state and back again by the adjustment of hydrogen ion concentration is perhaps the result of the formation of salts of casein when the concentration of hydroxyl is increased and the hydrolyzing of these salts when the acidity is restored. However, whatever this change may be, it is accompanied by the transition of the casein from a granular to a colloidal state and back again.

Upon the restoration of acidity, equilibrium also calls for the hydrolyzing of the salts and compounds of the volatile flavor producing acids and these substances become regenerated in the cheese. The cheese thus treated and pasteurized does not have the objectionable flat flavor of soft cheese of the acid type when pasteurized according to methods known prior to this invention.

Illustrative of this invention, a soft acid cheese may be treated, said cheese being made by any of the methods commonly known or according to the method outlined in application Ser. No. 545,149. To this soft acid cheese which will normally have a pH of about 4.6 there is added while stirring 0.2% sodium hyroxide in 10% water solution. The hydroxyl ions supplied by the sodium hydroxide will bring the pH value to approximately 6.0. This cheese of reduced acidity is now in a fixed form with respect to volatile flavor producing acid constituents and grain structure. The fixed cheese is then heated and agitated until a temperature of 160° Fahrenheit is attained. It is maintained at this temperature until pasteurization is accomplished. The selection of the pasteurizing temperature and the period of treatment is a matter of judgment and may be varied to a large degree as a matter of common knowledge. Near the end of the pasteurizing treatment dilute hydrochloric acid containing 3½% acid is added while stirring, over a period of two to five minutes until the chemical equivalent of 80% of the sodium hydroxide has been added. The cheese now will have a pH of about 4.8 and upon the completion of the addition of acid it is permitted to cool. The quantity of acid added may be regulated depending upon the final texture desired. The higher the final acidity the heavier the body of the resulting product. It is possible to attain an excessive acidity and body if too much acid is added and this should be avoided.

Many substances are suited as agents for the addition of hydroxyl ions but it is preferred that substances already in combination as salts in the cheese be used, such as sodium, ammonium, or calcium hydroxide or the basic salts of these basic ions such as are found with phosphate or citrate radicals. However, any alkaline salt or any base will serve the purpose providing that the same does not objectionably contaminate the finished cheese. Hereinafter any substance suitable for the supplying of hydroxyl ions will be referred to as a basic substance.

There is also a large class of substances suitable for the supplying of hydrogen ion. It is preferred that an acid or combination of acids already present in combination as salts in cheese such as hydrochloric, phosphoric, lactic, acetic or citric acid be employed. Other acids which will not objectionably contaminate the finished cheese may also be employed as well as appropriate acid salts of appropriate acids. Hereinafter we will refer to any suitable substance supplying hydrogen ion as an acid substance.

The use of sodium hydroxide and hydrochloric acid is particularly favored in the practice of this invention, because the final end products of the addition of sodium hydroxide and hydrochloric acid are common salt and water. Common salt is ordinarily added in the manufacture of cheese and the salt resulting from this reaction in no sense contaminates the mixture. In fact the amount of salt thus introduced is considerably less than the amount normally required and a further addition of salt is required.

At times the product of this invention may be improved or made more suitable for specific uses by subjecting the cheese to very drastic mechanical agitation before permitting it to cool. For example, at the end of the pasteurizing period the cheese may be placed while it is still hot in a viscolizing or homogenizing machine and subjected to the mechanical extrusion effect characteristic of this machine. The cheese may also be treated with other mechanical means as by very energetic stirring. This mechanical treatment of the cheese at times brings about an improvement or a desirable alteration in the texture of the cheese.

The completed cheese after pasteurization and treatment, according to this invention, may be cooled in body or may be packaged directly and allowed to cool in the container. In this way there is no possibility of contamination of the cheese before reaching the package and a cheese of superior keeping quality is obtained.

While there has been described herein the principles involved in the process of this invention and a specific way of practicing the same, it is not intended that the protection of Letters Patent be limited thereto but that the limitation thereof be defined by the scope of the appended claims.

What I claim as my invention is:

1. The process of treating soft acid cheese having a pH of about 3.5 to 5 which comprises, adding an amount of an alkaline substance to the cheese to bring its pH to about 5.5 or 6.5, pasteurizing the mixture and then adding an amount of an acid substance to the cheese to bring its pH back to about 3.5 to 5.

2. The process of treating soft acid cheese having a pH of about 3.5 to 5 which comprises mixing sodium hydroxide with the cheese in amount sufficient to bring its pH to about 5.5 to 6.5, pasteurizing the cheese mixture and then adding hydrochloric acid to the same to return the pH thereof to about 3.5 to 5.

3. The process of treating soft acid cheese having a pH of about 3.5 to 5 which comprises, mixing sodium hydroxide with the cheese in amount sufficient to bring its pH to about 5.5 to 6.5, heating the cheese mixture to pasteurizing temperature and then adding hydrochloric acid to the cheese in amount sufficient to restore the pH thereof to about 3.5 to 5 before permitting the cheese to cool.

4. The process of treating soft acid cheese having a pH of about 3.5 to 5 which comprises, adding an amount of an alkaline substance to the cheese to bring its pH to about 5.5 to 6.5, pasteurizing the cheese mixture, adding an amount of an acid substance to the cheese to bring its pH back to about 3.5 to 5 and then viscolizing the whole.

FELIX M. FREDERIKSEN.